US 7,805,680 B2

(12) United States Patent
Meyers et al.

(10) Patent No.: US 7,805,680 B2
(45) Date of Patent: Sep. 28, 2010

(54) STATISTICAL METERING AND FILTERING OF CONTENT VIA PIXEL-BASED METADATA

(75) Inventors: Stephan Meyers, Los Angeles, CA (US); Jussi Holopainen, Tampere (FI); Terje Lundin, Tampere (FI); Jonka Mattila, Tampere (FI); Eero Räsänen, Tampere (FI)

(73) Assignee: Nokia Corporation, Nokia Group (FI)

( * ) Notice: Subject to any disclaimer, the term of this patent is extended or adjusted under 35 U.S.C. 154(b) by 1839 days.

(21) Appl. No.: 09/753,844

(22) Filed: Jan. 3, 2001

(65) Prior Publication Data
US 2002/0087403 A1    Jul. 4, 2002

(51) Int. Cl.
*G06F 3/00* (2006.01)
(52) U.S. Cl. ..................................... 715/744
(58) Field of Classification Search ................ 345/744, 345/764, 766, 760
See application file for complete search history.

(56) References Cited

U.S. PATENT DOCUMENTS

| | | | | |
|---|---|---|---|---|
| 5,748,789 | A | * | 5/1998 | Lee et al. ..................... 382/243 |
| 5,855,008 | A | | 12/1998 | Goldhaber et al. ............ 705/14 |
| 5,964,660 | A | | 10/1999 | James et al. ................... 463/1 |
| 5,995,671 | A | | 11/1999 | Nagarajan et al. ........... 382/242 |
| 5,996,011 | A | * | 11/1999 | Humes ........................ 709/225 |
| 6,072,520 | A | | 6/2000 | Yuen et al. |
| 6,094,194 | A | | 7/2000 | Jackson |
| 6,108,637 | A | * | 8/2000 | Blumenau ...................... 705/7 |
| 6,442,529 | B1 | * | 8/2002 | Krishan et al. ................ 705/14 |
| 6,580,422 | B1 | * | 6/2003 | Reilly ......................... 345/169 |
| 6,595,859 | B2 | * | 7/2003 | Lynn ........................... 463/42 |
| 6,628,314 | B1 | * | 9/2003 | Hoyle ......................... 345/854 |
| 6,675,384 | B1 | | 1/2004 | Block et al. |
| 6,781,608 | B1 | * | 8/2004 | Crawford ..................... 715/758 |

(Continued)

FOREIGN PATENT DOCUMENTS

EP    0 837 599 A2    10/1997

(Continued)

OTHER PUBLICATIONS

Cooper L.F.: "More than just hits Web advertising" Informationweek, Manhasset, NY, US, No. 608, Dec. 2, 1996, p. 63, 68, 72 XP002082816.

(Continued)

*Primary Examiner*—Thanh T Vu
(74) *Attorney, Agent, or Firm*—Alston & Bird LLP (57) ABSTRACT

An apparatus for using metadata to more precisely process displayed content may include a processor executing stored instructions, which causes the apparatus to at least receive an image data frame including pixels having a visual object(s), wherein bits in the image data frame includes pixel data for a single pixel. The pixel data includes content and metadata fields. The metadata field includes a value. The metadata value indicates that the single pixel is part of a visual object in a category. The execution of the stored instructions may also cause the apparatus to identify pixels including a visual object by their metadata fields. The pixels include a visual object identifiable within the image data frame such that certain operations are performed on the pixels forming an individual visual object separate from pixels forming remaining visual objects in the visual field. Corresponding methods and computer program products are also provided.

20 Claims, 10 Drawing Sheets

U.S. PATENT DOCUMENTS

| | | | |
|---|---|---|---|
| 6,895,111 B1 * | 5/2005 | Swift | 382/165 |
| 2001/0014915 A1 | 8/2001 | Blumenau | |

FOREIGN PATENT DOCUMENTS

| | | |
|---|---|---|
| EP | 0 967 560 A2 | 12/1999 |
| EP | 1 073 223 A1 | 1/2001 |
| EP | 0870 402 | 4/2003 |
| JP | 2000502851 | 3/2000 |
| WO | WO 97/23996 | 7/1997 |
| WO | WO 97/31476 | 8/1997 |
| WO | WO 98/26529 | 6/1998 |
| WO | WO 00/52933 | 9/2000 |
| WO | WO 00/54183 | 9/2000 |
| WO | WO 01/80962 A1 | 11/2001 |

OTHER PUBLICATIONS

T. Sikora, "The MPEG-4 Video Standard Verification Model" IEEE Transaction on Circuits and Systems for Video Technology, IEEE Inc. New York, US, vol. 7, No. 1, Feb. 1, 1997, pp. 19-31, XP000678877.

IEEE Transactions on Circuits and Systems for Video Technology, vol. 7, No. 1, Feb. 1, 1997, pp. 19-31, "The MPEG-4 Video Standard Verification Model".

European Patent Office Article 96(2) Communication dated Dec. 1, 2004 and issued to a European application related to the present application.

Office Action dated Jan. 12, 2006 in corresponding Japanese Application No. 2002-555331.

* cited by examiner

STATISTICAL METERING AND FILTERING OF CONTENT VIA PIXEL-BASED METADATA

BACKGROUND OF THE INVENTION

1. Field of the Invention

This application relates to a method of using metadata to more precisely process content for display on a pixel-by-pixel basis.

2. Description of the Related Art

As the incremental cost of information and services delivered electronically approaches zero, consumers are unwilling or unable to pay in micropayments, i.e., electronic payments of miniscule amounts, such as a fraction of a Dollar or Euro, to receive this information, whether as a web page to be viewed with a web browser or in another electronic format. It is also too cumbersome and expensive to actually charge a consumer such a miniscule amount of money to view a single web page. Instead, consumers are granted free access to many, if not most, web pages. To generate revenue to cover at least a portion of the costs of delivering information and services electronically, businesses obtain "online" advertising from a third party "sponsor" to be displayed to visitors of the business' web site. The advertisements are displayed in a space or spaces on a web page devoted to the display of advertising. Typically, at least one of the advertisements is displayed as a banner at the top and/or bottom of the web page. The sponsor is often another web site operator who wishes to attract visitors to its web site using the advertisement; the sponsor may, but need not, have a relationship with the web site beyond the advertisement. Generally, a user need only click on the advertisement to transfer from the web page containing the advertisement to the sponsor's web page, which then appears in the web browser.

In the advertisement environment currently prevalent, sponsors of Internet advertisements often do not directly deal with the web site operator who displays the advertisement. Rather, an intermediary between the advertisement sponsor and the web site operator which carries the advertisement typically arranges the transaction, placing advertisements on web sites that attract a visitor having certain characteristics that match a desired audience for the sponsor's web site. The intermediary may also operate an ad server that downloads the advertisement to the user when the user visits a web page, exchange monies between the parties, and, in certain instances, track any transactions that result from a visit to the sponsor's web site.

The advertisers are generally charged for placing the advertisements on a web page on either a per-clickthrough or a per-impression basis. A per-clickthrough billing rate charges an advertising web site sponsoring the advertisement for each time a user clicked on the advertisement to visit the sponsor's web site. The per-clickthrough billing is usually metered by the sponsoring site and therefore only counts the number of actual visits to the sponsor's web site. This billing option is not always fair to the web site that displayed the sponsor's ad because, for technical or other reasons, clicking on the ad will not always cause the sponsor's web page to be displayed on the user's terminal, which means that they will not get paid for the clickthrough.

A per impression billing rate charges an advertiser each time the advertisement makes an impression on a user's terminal. This occurs when a web page is accessed using a web browser and an ad server transmits an advertisement for placement on the web page. There is no requirement that the advertisement actually be displayed, at least in part because of the current technical difficulty, if not impossibility, of insuring that the advertisement is displayed. The number of impressions is counted by the distributor of the advertisement, usually the intermediary. In this case, there is no measurement of actual delivery of information to a user. So, for example, if an ad space is located at the top of a typical web page which cannot be displayed all at once on a single screen, a user scrolls down the web page before an advertisement is loaded into the banner advertisement space at the top of the web page, and the user does not return to the top of that web page, the user never sees that advertisement, but the advertiser is charged anyway. If, however, a user spends a lot of time looking at the part of the web page that contains the advertisement, the advertiser is not billed extra beyond the charge for the single ad impression. This may be unfair to advertisement sponsors.

As charging on either a per-clickthrough or a per-impression basis has its shortcomings, it would be advantageous and fairer to both the ad sponsor and the web site operator bearing the sponsor's advertisement banner to have a system and method which allows an advertiser to be billed on a modified per-impression basis in which the advertiser is billed only for those impressions of advertisements onto a web page for the length of time the advertisements are actually viewed by a user and for the percentage of the advertisement viewed.

Moreover, as electronically-delivered information is presented and packaged more elaborately and in an increasingly sophisticated and complex way, it is challenging to establish a reasonable payment scheme for advertisers whose advertisements appear within a complex multimedia presentation. For example, an advertisement may be displayed within the context of a three-dimensional (3-D) presentation which might not be seen at all by a particular user, or might not even be readable because at a sharp angle to the viewer the advertisement is distorted or because the advertisement might be shown far in the distance and be difficult to discern. As another example, some users may choose to block advertisements from appearing on their screen by overlapping the window with the advertisement with another one or more windows or by some other software means. In these circumstances, it has not yet been determined how to best charge for an advertisement placed within the presentation.

At the same time, there is an increasing interest in blocking certain types of information. For example, users may not wish their children to view pornography or violent imagery. Also, many companies would like to have a means of preventing the playing of video games (video games) on office computers. While these examples offer scenarios where a user may wish to block all of a particular type of content, in some cases, a user may wish to block only a portion of a multimedia document and permit the remainder of the document to be displayed, as only that portion may have offensive or otherwise undesirable material.

One means of blocking undesirable information is through the use of metadata (i.e. structured information about information) that is inserted into a document, on a per document basis, in a manner that is invisible to the user to classify the document as a whole as belonging to a particular class, such as pornographic material. Current filtering software can then be used to scan the document for metadata and block a full page or other multimedia object containing certain metadata, but, metadata is often not sufficiently precise or accurate. As a result, the filtering software often blocks content which should not be blocked or fails to block content which should be blocked. It would be advantageous to have a more precise way of filtering out exactly the information which needs to be filtered and leave the remaining unfiltered information for display.

Computer graphics displays display images using thousands of pixels generally arranged into rows and columns. The greater the number of pixels on a display of a particular size, the greater the display's resolution. Each pixel shows a small portion of the image and is represented in video memory by a certain number of bits, the number depending on the available amount of memory and the amount of information required for displaying the pixel. An RGB color graphics system comprises information for color pixels formed by red, green and blue dots that essentially overlap to form the desired color. These colors are conventionally represented in a 32 bit graphics system using four 8 bit channels: three channels are used to encode information for pixels for each of the three colors, and a fourth channel, known as the alpha channel, provides transparency information for blending the three colors. The alpha channel is usually set to be identical for a group of adjacent pixels that form an object or portion of an object.

As graphics cards evolve to allow for more bits to be allocated per pixel, some of the additional bits have been used to add a virtual third dimension (a z-axis) to an image a Z-buffer. The Z-buffer is used in 3-D graphics to specify, where there are multiple objects that share an x- and y-coordinate, which objects or portions thereof should be visible and which should be hidden (by being overlaid with another object). Further bits may be added for other various and sundry purposes. It would be advantageous to utilize additional available bits to insert metadata for more precise metering and filtering of information.

SUMMARY OF THE INVENTION

It is therefore an object of the present invention to provide a system for providing discretionary viewing control in displaying data. The system comprises a display, comprising a plurality of pixels, for displaying data, and an integrated circuit in connection with the display for processing the data. The data to be processed includes at least a first portion, including payload data, and a second portion, including metadata, that are linked together. The payload data provides content to each pixel of the plurality of pixels at the display independently and the metadata has a value selected from a predefined set of values and identifies each pixel at the display independently. The processable pixels at the display are thereby classified according to a particular metadata value selected from the predefined set of values.

It is another object of the present invention to provide a method for providing discretionary viewing control in displaying data. The method comprises providing a display comprising a plurality of pixels, receiving data, which data includes at least a first portion, including payload data, and a second portion, including metadata, that are linked together, supplying the received data to an integrated circuit in connection with the display, and processing content for each respective pixel based on an identification of each respective pixel by the metadata. The payload data provides the content to each pixel of the plurality of pixels at the display independently. The metadata identifies each respective pixel at the display independently by classifying each respective pixel according to a metadata value selected from a predefined set of values.

It is another object of the present invention to provide a method for metering visibility of an advertisement. The method comprises providing a display with a plurality of pixels and receiving data, which data includes at least a first portion, including payload data, and a second portion, including metadata, that are linked together. The payload data provides content to each of the plurality of pixels of the display independently, and the metadata identifies each respective pixel of the display independently by classifying each respective pixel according to a particular metadata value selected from a predefined set of values. The method further comprises supplying the received data to an integrated circuit in connection with the display, processing the content for each respective pixel based on the identification of each respective pixel by the metadata, and periodically metering the number of pixels classified as advertisement by the metadata.

It is another object of the present invention to provide a method for providing an incentive to a player of a game. The method comprises providing a display having a plurality of pixels, and supplying data to an integrated circuit in connection with the display. The supplied data includes at least first and second portions of data that are linked together, the first portion including payload data and the second portion including metadata. The payload data provides content to each of the plurality of pixels of the display independently, and the metadata identifies each respective pixel of the display independently by classifying each respective pixel according to a metadata value selected from a predefined set of values. The method further comprises processing the content for each respective pixel based on the identification of each pixel by the metadata, opening a non-game item in response to a player activation of any of the pixels specified belonging to a non-game class, and awarding a reward to the player upon viewing the non-game item.

It is another object of the present invention to provide a data frame to be processed in an integrated circuit and displayed pixel-wise. The data frame comprises at least first and second portions of data that are linked together, the first portion including payload data and the second portion including metadata. The payload data provides content to each pixel of a display independently, and the metadata identifies each pixel of the display independently by classifying each pixel according to a metadata value selected from a predefined set of values.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

To overcome limitations in the prior art described above, and to overcome other limitations that will become apparent upon reading and understanding the present specification here is described a system and method for providing discretionary viewing control in displaying data pixel-wise and methods to meter.

Figure 1A:
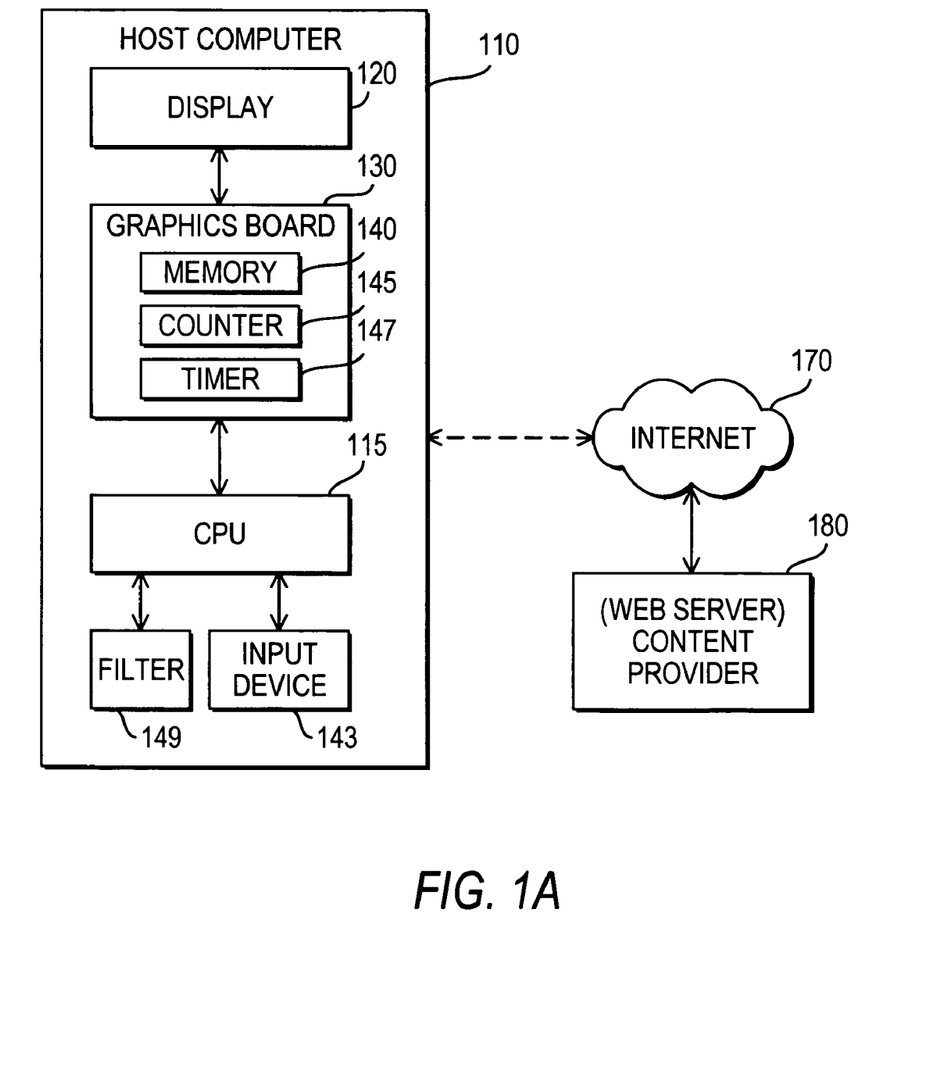
FIG. 1A is a diagram of a system architecture for practicing the present invention using a fixed terminal according to one embodiment of the invention.

In accordance with one embodiment of the invention, FIG. 1A shows a simplified drawing of a system for distribution of content having the illustrated components for practicing the present invention using a fixed terminal. The content distribution system includes a host computer 110 having a central processing unit (CPU) 115 for controlling and executing all necessary procedures, a display 120 for displaying graphics, a graphics board 130 or subsystem (integrated circuit) installed internally or externally to host computer 110 to interface between CPU 115 and display 120, and an input device 143 to enter commands, such as to order content for use at host computer 110, and information. Display 120 may be a monochrome display or a color display, such as an RGB display having separate channels for red, green and blue colors, and possibly alpha and/or Z-buffer channels. Graphics board 130 has an on-board memory 140 of a sufficient size to allocate bits on a per pixel basis to the content to be displayed and to metadata. Graphics board 130 also has a counter 145 to count the number of pixels in a given frame with a particular metadata value or to keep a running total or average over multiple frames, a timer 147 to measure the length of time pixels with the particular metadata value are displayed, and a filter application 149, either in hardware or software within graphics board 130 or elsewhere in host computer 110, to filter out certain pixels from being displayed. The graphics engine, which maintains graphics support functions, may be hardware-enabled or enabled in graphics software resident on host computer 110, as is known to one skilled in the art. Host computer 110 in FIG. 1A is shown as a fixed terminal.

The content distribution system may further provide access from the host computer 110 to a network 170 such as the Internet. The Internet connection may be used in the context of this application for various purposes, including to download a web page from a content provider (which may provide the content ordered by a user over a web server 180) to host computer 110 via network 170 which receives the ordered content from the content provider 180 and forwards it to the display 120. The Internet connection may also be used to play a networked video game.

Figure 1B:
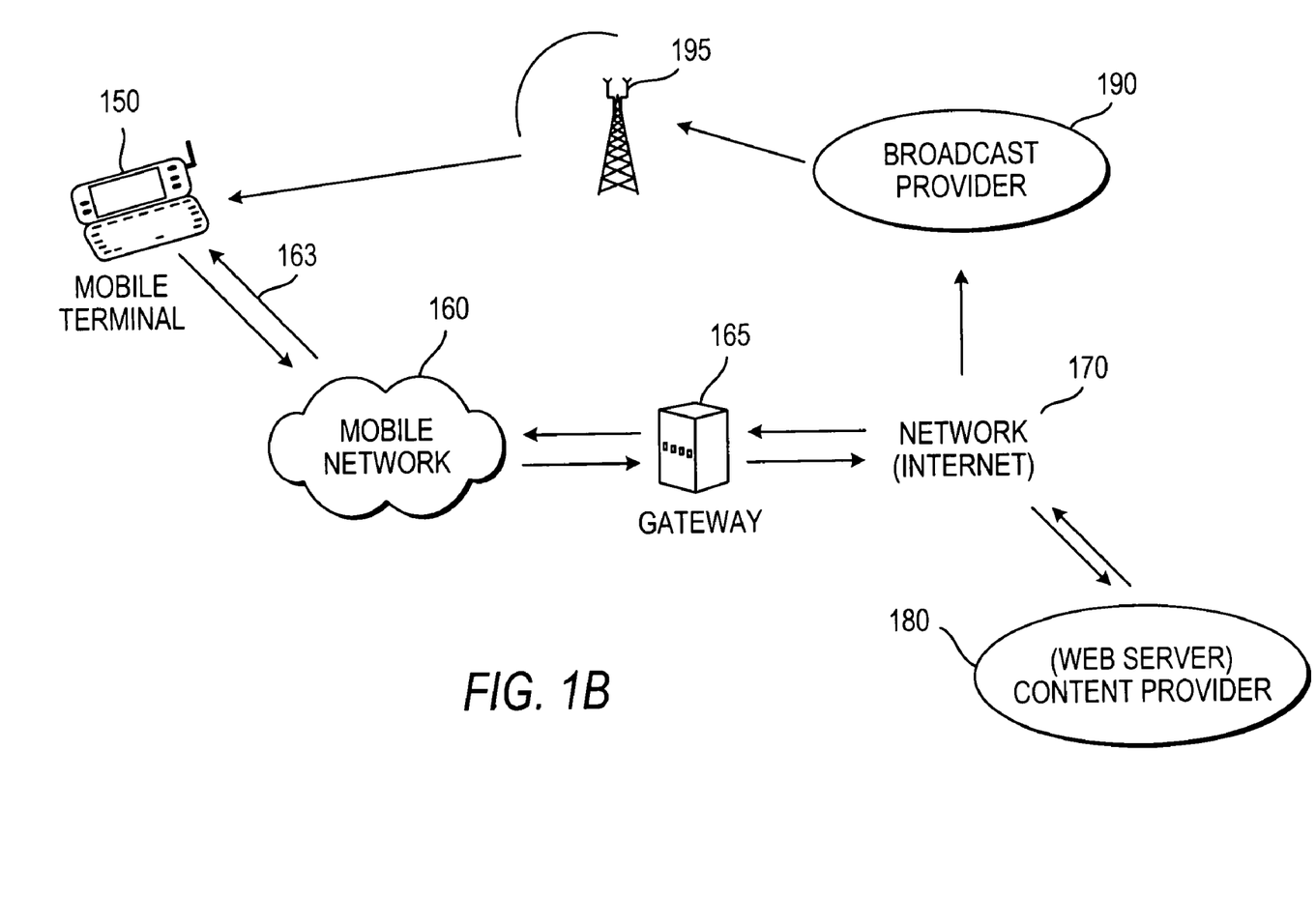
FIG. 1B is a diagram of a system architecture for practicing the invention using a mobile terminal according to another embodiment of the invention.

FIG. 1B shows an alternative system architecture in which a mobile terminal, such as a mobile telephone, a personal digital assistant (PDA), a laptop computer or another device, wirelessly links to a mobile communications network having capabilities equivalent to host computer 110. Mobile terminal 150 is bidirectionally linked to mobile network 160 over link 163 and mobile network 160 is in turn, bidirectionally linked to a network 170 such as the Internet via gateway 165. The network 170 is bidirectionally connected to a content provider 180 from whom content may be ordered. Content provider 180 may comprise a web server from which the content is accessible. The ordered content may be sent from content provider 180 to mobile terminal 150 via mobile network 160 which receives and forwards the content to mobile terminal 150, or, the ordered content may be sent to a broadcast provider 190 which may broadcast the content over transmitter 195 to mobile terminal 150.

Figure 2:
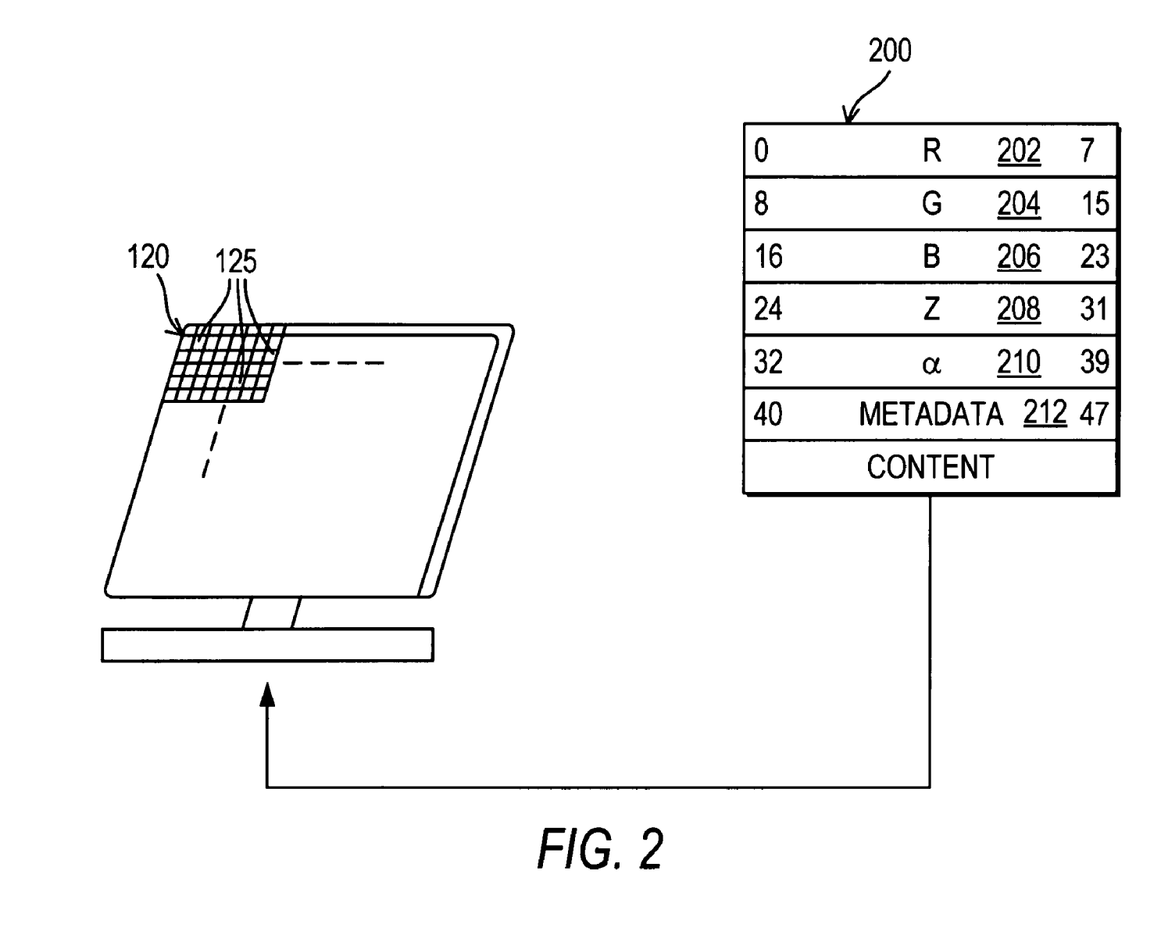
FIG. 2 is a schematic diagram of the components of a video signal according to one embodiment of the present invention having multiple channels input to the display.

As shown in the schematic representation of FIG. 2, where display 120 is an RGB display having a plurality of pixels 125, data for each color pixel 125 of a data frame displayed on display 120 is allocated at least 48 bits in the video memory 140, represented by box 200, to represent the content of each pixel 125. Bits 0-39 are "payload data": 8 bits (bits 0-7) of the 48 bits are dedicated to a red channel 202, 8 bits (bits 8-15) to a blue channel 204, 8 bits (bits 16-23) to a green channel 206, 8 bits (bits 24-31) to a Z-buffering channel 208, and 8 bits (bits 32-39) to an alpha channel 210. The invention is enabled by the allocation of an additional set 212 of bits, which may, for example, be 8 bits (bits 40-47), that are linked to the payload data and are used as "metadata" to identify the type of content provided for that pixel 125. (Each pixel is generally allocated payload data and metadata independently of the other pixels.) The payload data and metadata may be stored and streamed to display 120 as compressed data. While 8 bits is presented as an example, fewer or more than 8 bits can be allocated per pixel for metadata. It is unnecessary to dedicate a certain amount of graphics memory for metadata bits at all times. Rather, applications which use metadata bits may, request from the graphics engine that a certain range of metadata addresses be temporarily allocated while those applications are open.

The metadata designation of the type of content can be used in various ways. For example, as described in more detail below, it may specify that the pixel 125 belongs to an advertisement, belongs to an object for display that contains material such as violence or pornography not suitable for certain users such as children under a certain age, or belongs to a certain element in a video game that is a means of obtaining additional points.

Where metadata 212 identifies that a pixel 125 belongs to an advertisement, an improved scheme ("metric") for billing for advertisements can be devised. This scheme is predicated on the fact that an advertisement is only effective when it is displayed and visible to a user and the premise that the larger the advertisement the more effective the advertisement usually is. Thus, the graphics engine of graphics board 130 scans for metadata 212 and, upon detection, counts the number of pixels 125 in the displayed data frame having metadata 212 of a value indicating that the pixel 125 is part of an advertisement. A record may be maintained of the total number of pixels 125 displayed or an average over time using counter 145. The advertiser is charged using a "pixel×time" metric which multiplies the number of pixels 125 identified by metadata 212 as belonging to an advertisement that are visible on the display screen by the length of time that these pixels 125 are visible, as measured by timer 147, to determine how much the user is to be charged.

Figure 3:
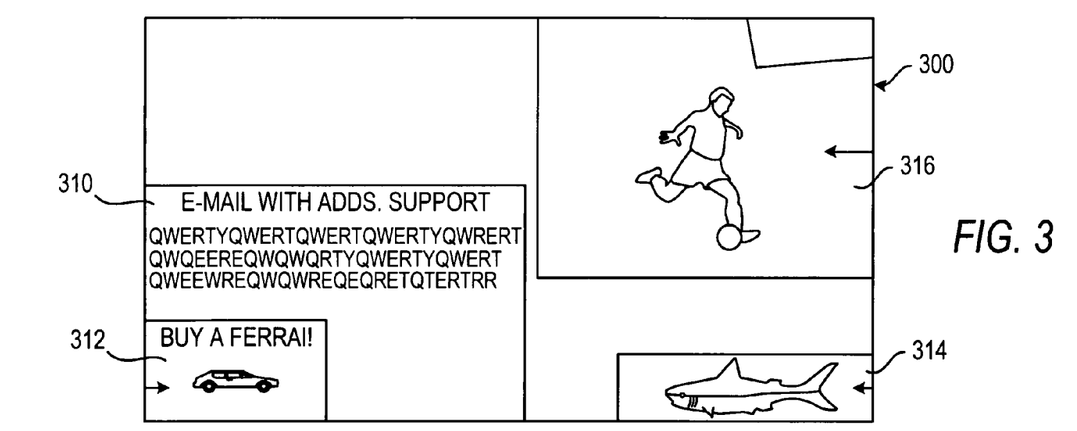
FIG. 3 is a schematic representation of a display showing multiple windows of data, including a content channel window in a first position and two advertisements.
Figure 4:
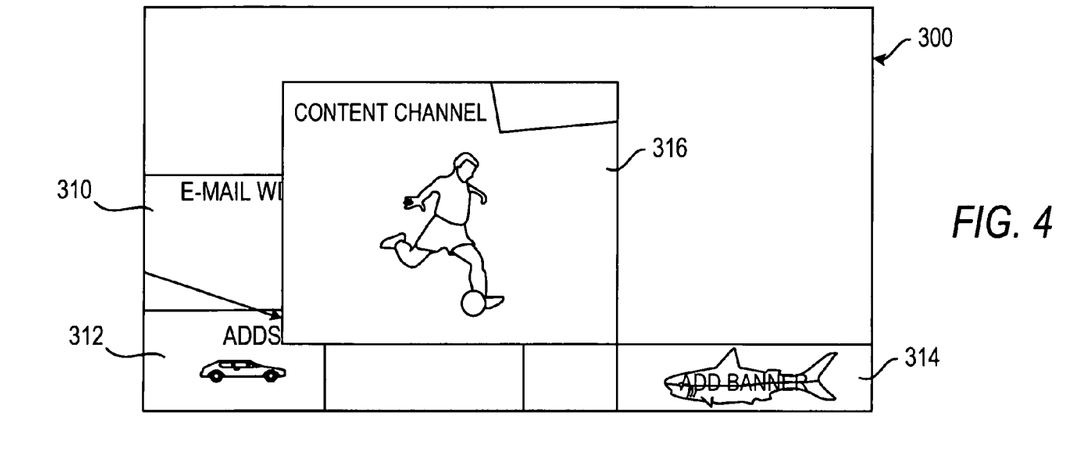
FIG. 4 is a schematic representation as shown in FIG. 3 but with the content channel window shifted to a second position where it blocks from view a portion of one of the advertisements.

For example, in the sample screen 300 shown in FIG. 3, an email 310 is opened and a first advertisement 312 within the email 310 is visible in its entirety. The advertiser is charged for the number of pixels 125 occupied by the advertisement 312 multiplied by the amount of time the advertisement 312 is visible, e.g., 30 seconds. Also shown in FIG. 3 is a second advertisement banner 314 and a window 316 containing a content channel. The user may then decide to move the content channel window 316 to overlay a portion of first advertisement 312, as shown in FIG. 4, for whatever reason, such as to launch another program that will occupy a window to be displayed in the vacated space. Using the "pixel×time" metric, since only a portion (approximately ⅚) of the advertisement 312 is now visible, the advertiser is charged for the display of the entire advertisement 312 during the time the entire advertisement 312 is displayed based on the "pixel×time" metric and, for the portion of time that the advertisement 312 is only partially visible, the advertiser is only charged for that portion of the advertisement 312 that is visible, based on the number of pixels 125 occupied by the portion of the advertisement 312 that is visible, multiplied by the length of time the pixels are displayed according to one embodiment of the invention. Similarly, if the number of pixels 125 of the advertisement 312 that are visible were changed a third time, the number of pixels 125 displayed times the length of time the pixels 125 are displayed would be added to the first two computations. Thus, there is a summation of the "pixel×time" metric over a total period of time that advertisement 312 is visible. Alternatively, the advertising charge can be based on the average number of pixels 125 of an advertisement that are displayed over the time that the advertisement is displayed. Either the summation or averaging technique can be used to charge for additional advertisements that are displayed, each advertisement 312 being individually metered.

Other ways in which the size of the advertisement 312 that is visible may change include a user scrolling down a web page (not shown) so that only a portion of an advertisement 312 remains visible or shrinking the size of a window 310 in which the advertisement 312 appears so that only a portion of the advertisement 312 appears. Using this metric, if the advertisement 312 completely disappears from the screen the advertiser will not be charged at all.

This metric is more equitable than per-clickthrough and per-impression billing systems and conforms well with the current WWW practice of charging more for a larger banner advertisements. It is also an effective means of charging for those web pages that change banner advertisements during a fixed period of time without a page reload—e.g., advertisers are sold blocks of "160×40 pixels×30 seconds" and the advertisements change after 30 seconds.

Moreover, there are Internet service providers who provide free Internet dialup access, but the service includes an application that forces an advertising window or advertising frame around the web browser window to be displayed on the screen during the Internet session. Because they find the advertisements intrusive, enterprising hackers have found ways to eliminate that window, and others more simply attempt to cover the advertisements with another window. The "pixel×time" metric provides a method of equitably charging advertisers who place these type of advertisements only for ads that are seen by the user, although this may not be an approach favored by the service providers.

This metric can also be applied to a new advertising scheme that many pundits believe will become prevalent in the new realm of digital high definition TV: advertising that appears in a banner-ad fashion in the border areas of television programs. When the "pixel×time" metric is combined with a bi-directional television delivery network (not shown), advertisers can have exact information as to what content the television viewers are watching and will more precisely target their ads to the viewers. This more flexible system which provides for more channels of content may allow artists to create more adventurous content, since they will not have to rely on traditional formats, channels, program lengths, and other established media habits. This system also enables advertising that is more lucrative to the content provider while consuming less of the visual field of the television for a shorter length of time.

As with advertising, metadata 212 allocated to pixels 125 used to display an object can be used to classify the object as belonging to a particular category or categories, such as a category for particular information not desired by a user, like conduct that some may find objectionable and wish to block. For example, where the object is a nude person, pixels for that object may incorporate metadata the value of which reflect that classification. By scanning for and locating metadata 212 that identifies a pixel as containing objectionable content, filter 149, implemented either in hardware or software, can be set by a user, administrator, parent, etc., to filter out only the located objectionable object with a certain metadata setting so that the pixels 125 classified as belonging to that category are displayed as black or otherwise obscured such as by blurring or scrambling those pixels and only the silhouette of a person is visible. Moreover, filter 149 can be enabled to filter out or obscure objectionable content at different levels. For example, at one level faint outlines of the objectionable content can be left for viewing and at another level all of the objectionable content can be obscured. After filtering the image, one can still view an unfiltered portion of the screen. The metadata does not block the red, green, blue, Z-buffer, or alpha channels 202, 204, 206, 208, 210; those channels continue to be fed through the graphics pipeline but the filter can be used to filter those pixels 125 from being displayed. By allowing for several different metadata values for a particular type of objectionable conduct, as described below, filter 149 can be used to distinguish between different categories of objectionable content.

One such application of the invention is in the video game industry, in particular for a video game that virtually displays three dimensional imagery (a "3-D game"). Metadata 212 can be used to filter out by deleting or obscuring (like by scrambling or blurring) certain undesirable portions of a screen, such as nudity, violence, or other objectionable material, without blocking the contents of the entire screen or the metadata 212 classifying pixels 125 as belonging to a game can be used to block the display of the entire game and prevent a user from playing.

Figure 5A:
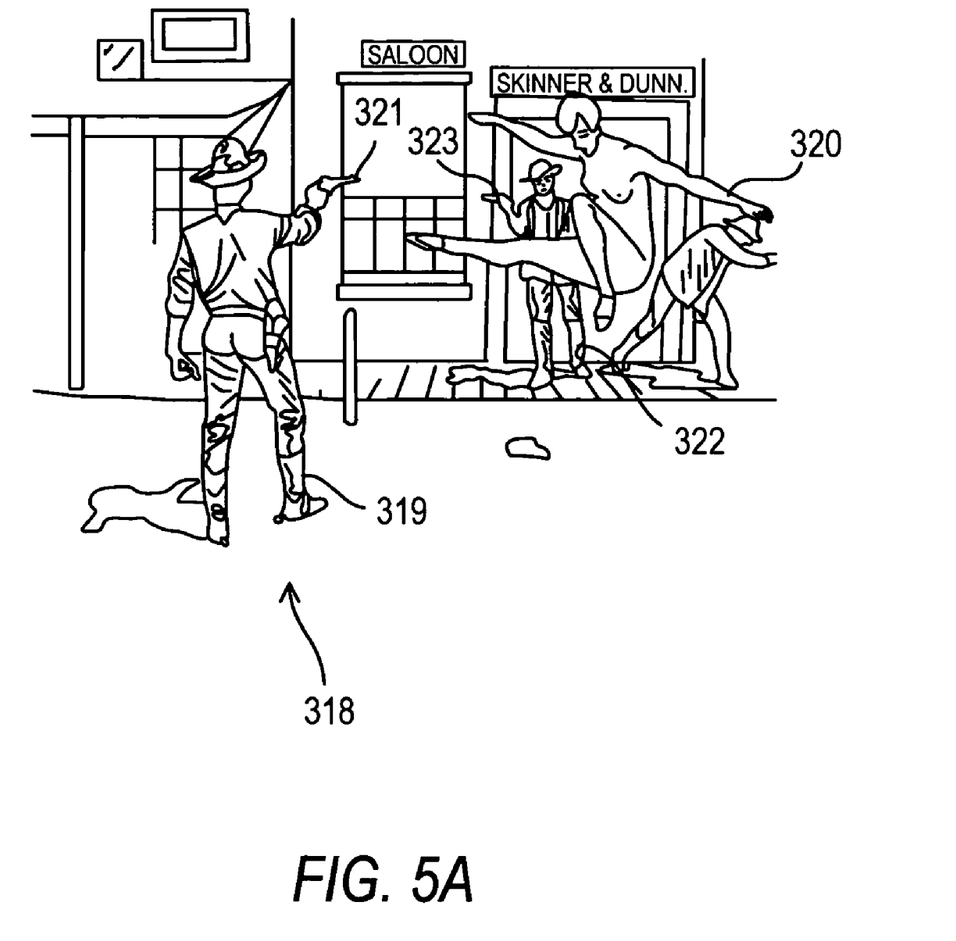
FIG. 5A is a screen shot of an image showing seminude male and female animated characters with the male characters pointing guns at each other according to one embodiment of this invention.
Figure 5B:
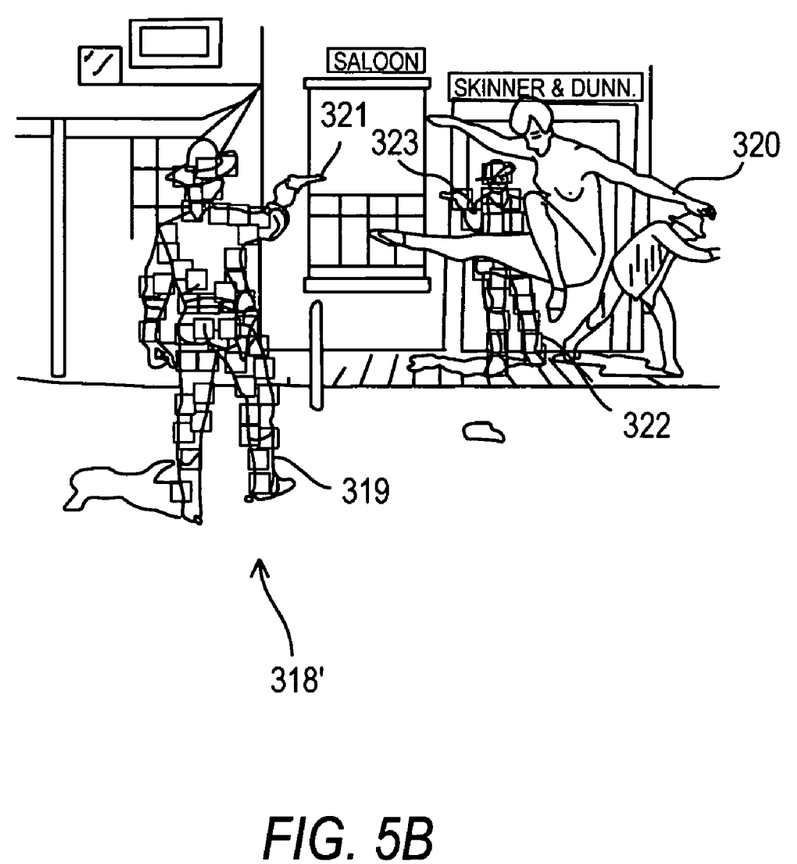
FIG. 5B depicts the screen shot of FIG. 5A showing the male characters partially obscured to obscure the nudity and violent content according to one embodiment of this invention.
Figure 5C:
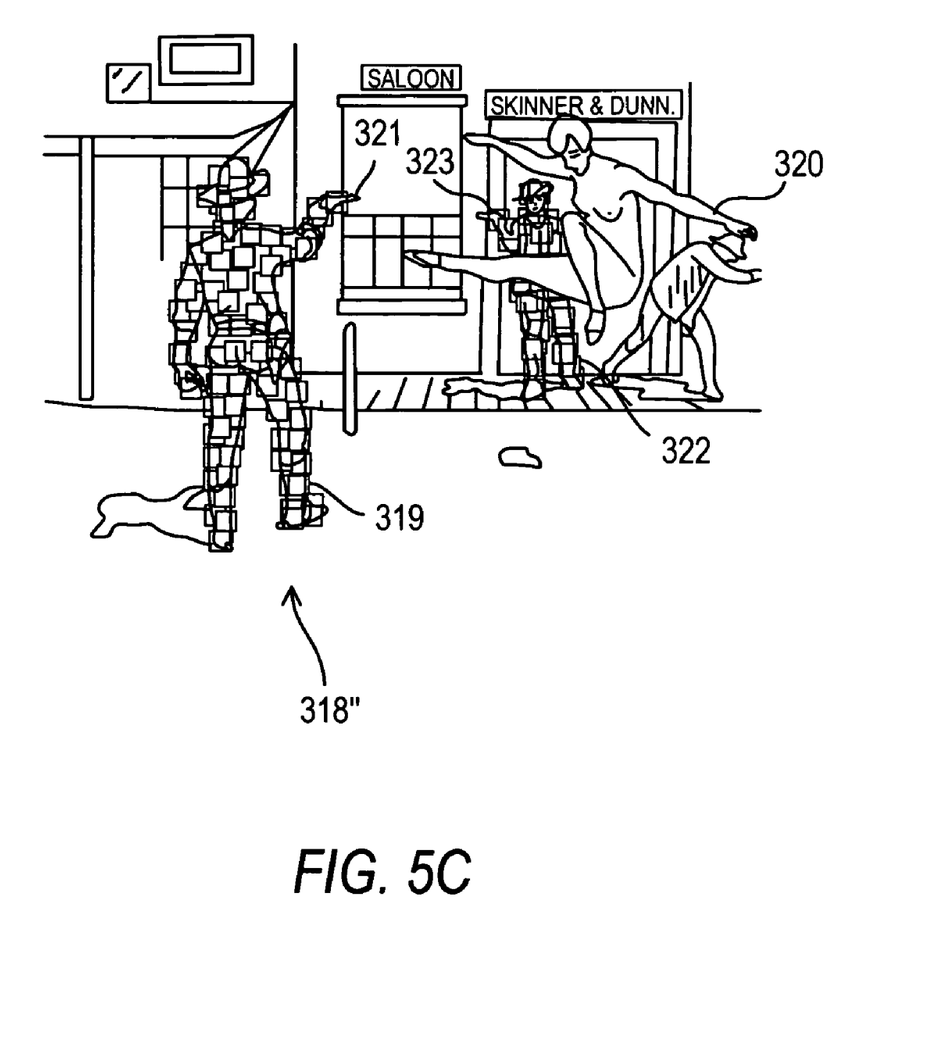
FIG. 5C depicts the screen shot of FIG. 5A showing the nude portion of the male character more obscured than in FIG. 5B to further obscure the nudity and violent content according to one embodiment of this invention.
Figure 5D:
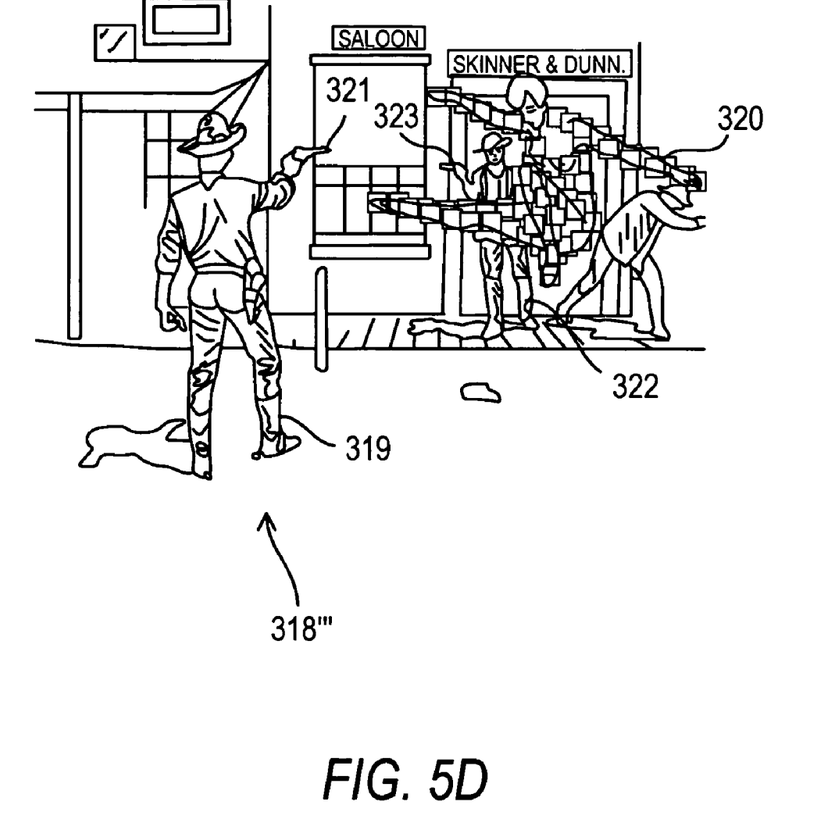
FIG. 5D depicts the screen shot of FIG. 5A with the nude portion of the female character obscured according to one embodiment of this invention.

FIGS. 5A-5D illustrate an example of using the invention to filter out only certain undesirable portions of the screen. FIG. 5A is a screen shot 318 of an uncopyrighted image showing semi-nude male and female animated characters 319, 320. Male character 319 is pointing a gun 321 at another male character 322 who is pointing a gun 323 at character 319. Metadata associated with character 319 is used to indicate nudity and/or violent content, and metadata for character 322 indicates violent content. Filter 149 causes the respective pixels tagged with this metadata to be obscured when a filter setting is selected. One such filtered image is shown in screen shot 318' in FIG. 5B where the pixels for the characters 319, 322 are scrambled but certain outlines of their clothing and guns 321, 323 remain somewhat visible. This filtered shot 318' can be considered as a "PG-rated" version of an originally "R-rated" screen shot 318 (akin to the current movie rating system). A tamer screen shot 318", which is a "G-rated" version of screen shot 318, is shown in FIG. 5C. In this figure, the pixels depicting characters 319, 322 are scrambled more than in FIG. 5B so that the objectionable content is completely obscured. Of course, the violent content can be filtered without filtering the nudity and vice versa. FIG. 5D shows another modified version 318''' of screen shot 318 in which characters 319, 322 are fully visible and character 320 has metadata that indicates nudity. This metadata is detected by filter 149 which scrambles the pixels representing the nude portion of character 320. Alternatively, in FIGS. 5A-5D, the obscured portions can instead be completely blacked out.

A networked video game, possibly implemented over the Internet 170 and played collaboratively by two or more players, could be supported by advertising. Thus, another application of the invention could be as a mechanism to encourage players of networked video game to view advertisements by offering incentives to those who view the advertisements, as measured by a statistical engine. These incentives may take the form of a reward to the player who views the advertisement. The reward may take the form of issuing to the player additional "energy", additional time to play the game, bonus points, additional weapons, extra powers, or the like, when a player views the advertisement. If, for example, a player's health in the game is at a low level, the player could position his avatar, i.e., the game character representing the player in the game (typically an animated character), near an advertisement covering a virtual wall in the video game, thereby causing the advertisement to fill the player's entire screen. While doing so, the player would be at risk of attack by other players and monsters, but the player's health would be "recharged" by a certain amount. Accordingly, the advertiser accomplishes its objective of having a user view an advertisement. The advertisement may appear within the video game window or outside that window. The incentive might be increased based on the number of pixels 125 occupied by the advertisement and the time that the advertisement is displayed.

Figure 6:
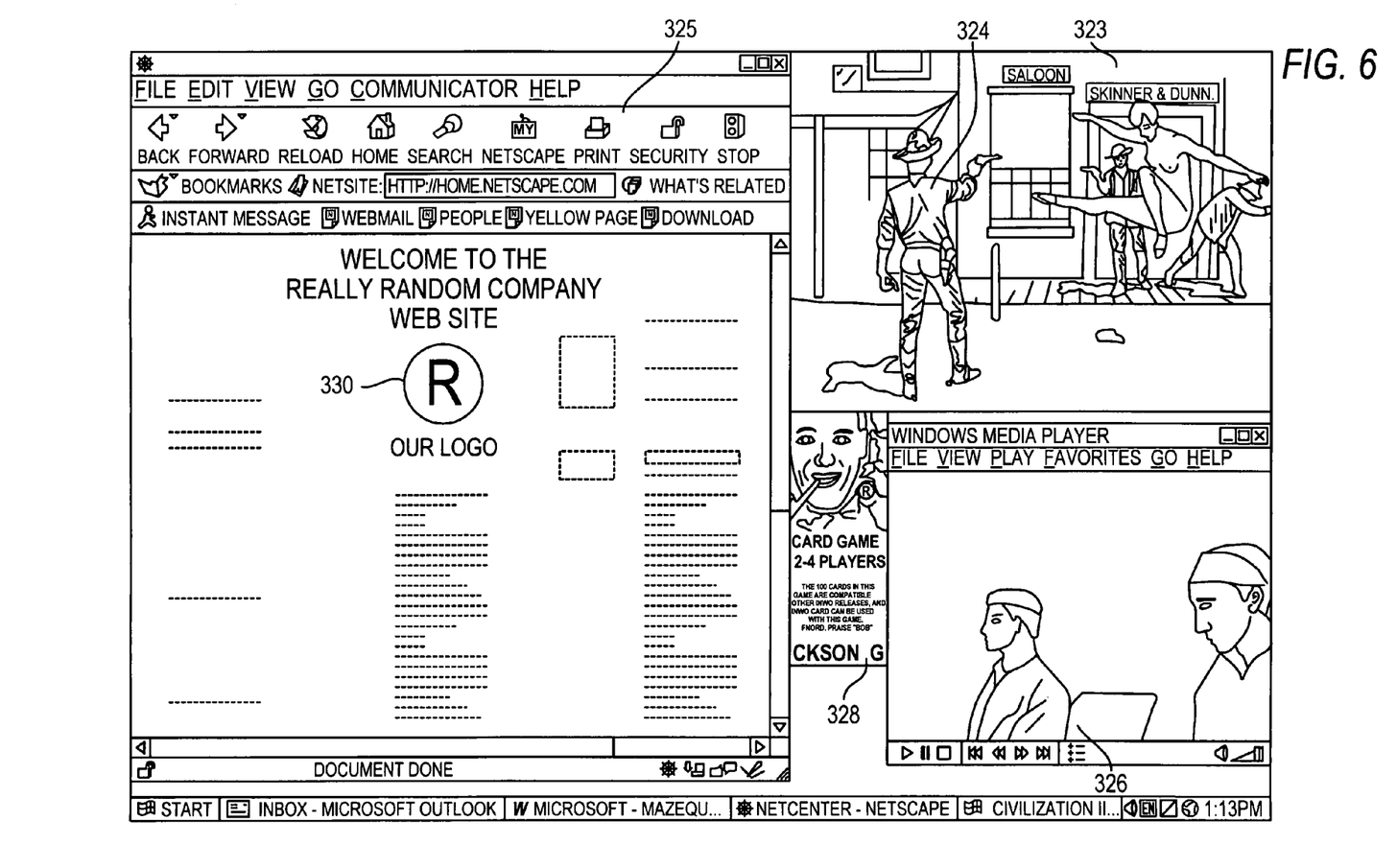
FIG. 6 is a printout of a display showing multiple windows, including a web browser window, a video game window, a partially visible advertisement, and a window displaying a television feed.
Figure 7:
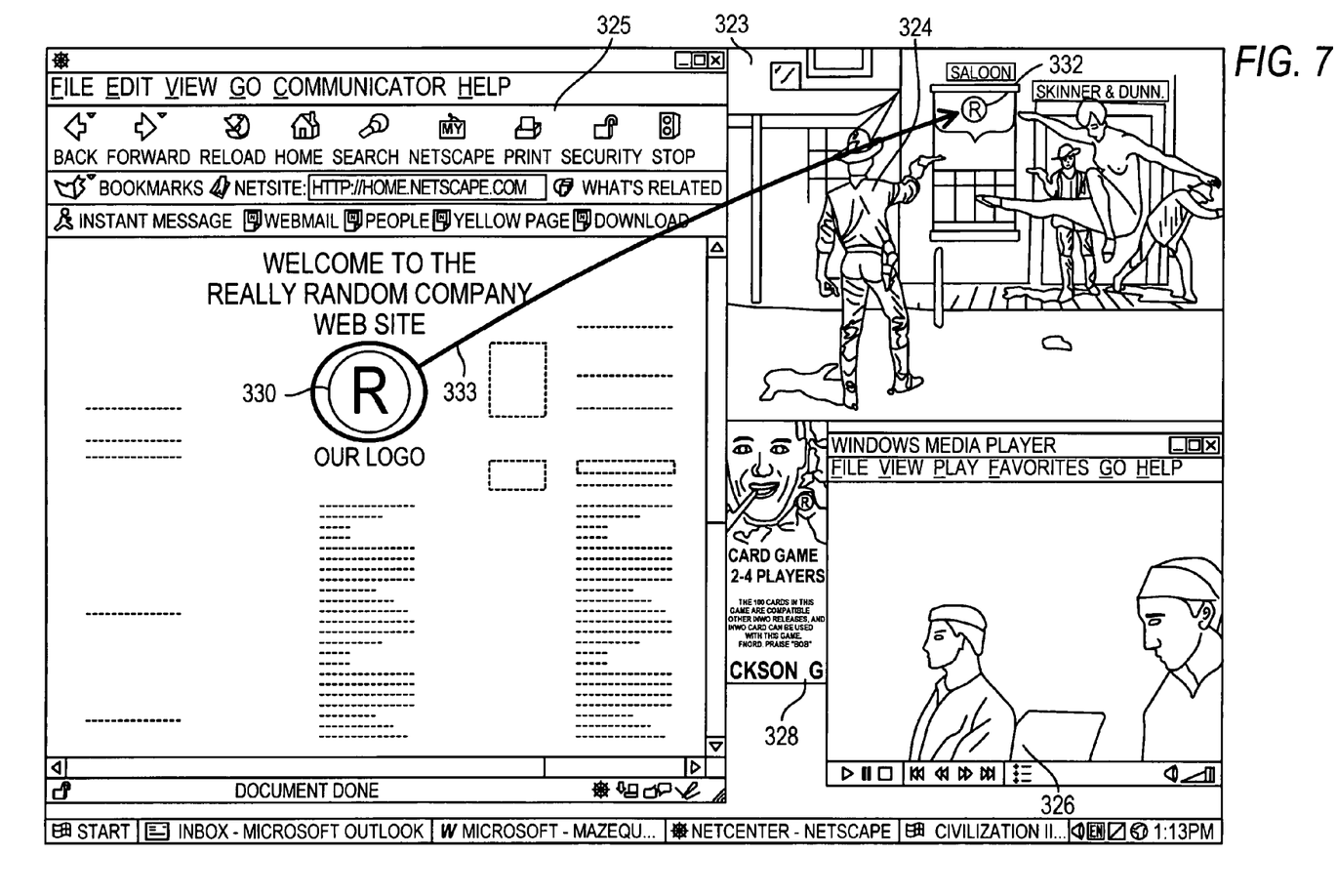
FIG. 7 is a printout of the display of FIG. 6 with an advertisement banner from the web browser window shown in the video game window.

For example, in FIG. 6, a printout of a sample computer screen 322 shows a game window 323 opened and an avatar 324 for the player. Also shown is a window 325 partially displaying a web page, a window 326 displaying a television feed that may have its own metadata, and a partially visible advertisement 328 obscured in part by adjacent overlaid windows 323, 325, 326. When a game character, controlled by a player, is running low on points which are needed to purchase ammunition for the character to destroy opponents, the player can obtain additional necessary points by highlighting or otherwise selecting an advertisement banner 330 in window 325 (or any other open window) and copying it to game window 323, possibly by drawing arrow 333, to create another copy 332 of the advertisement 330 (FIG. 7). Advertisement 332 may appear in window 323 in any way, such as a two-dimensional object or as a three-dimensional object within a 3-D game. Advertisement 332 may be inserted in window 323 in another way as well, such as from a command in a pull-down menu to view an advertisement. The metadata bits 212 could also be used in window 326 of FIGS. 6 and 7 to block or blur "objectionable" content in a window, such as objectionable television content in window 323, as described above.

The number of metadata bits 212 allocated and the values that are selected to represent the various available categories into which the pixels 125 are classified may vary. As one example, a 3-D video game might request 8 values from the graphics engine (regardless of the manner in which the graphics engine implemented in hardware and software) with which to encode data regarding a pixel 125 as metadata. To obtain 8 possible values requires 3 metadata bits 212. Any other bits allocated as metadata bits 212 for the purposes of this example would go unused by the present invention. These 8 values could be used to categorize a pixel 125 as belonging to a category, such as belonging to a video game, containing objectionable content, or containing an advertisement, each category of which would be mutually exclusive of one another. In this example, a value 000 would be assigned to classify a pixel 125 as belonging to game content, the value 001 to objectionable game content, and the values 010 to 111 for advertisements, each value from 010 to 111 would designate a pixel as belonging to one of six possible advertisements that could be separately tracked, the advertisements appearing either all in one window or in multiple open windows. Values 000 and 001 might then be designated as values that a filter could filter out so that a pixel having a metadata value of 000 or 001 would be blackened or blurred. Values 010 to 111 could be "statistical values" to track the number of pixels for an advertisement shown while viewing a video game for purposes of generating incentives to view the advertisement.

Upon completion of each frame, the graphics engine returns a statistical value for the number of pixels devoted to each of the advertisers mapped to metadata values of 010 to 111. Rather than being returned after each frame, this statistical value could be returned at less frequent intervals, as well, such as once per second.

In a windowing environment, multiple different windows might each request a range of values from the operating system, which might, especially in the case of metering advertising, need to be exclusive for each window for the graphics hardware to be able to meter. Thus, it may be necessary to allocate at least 16 or more bits for metadata. Using 3 bits for each window, 16 bits of metadata would provide metadata for five separate windows.

As one alternative to utilizing three bits to categorize the content of pixels as belonging to mutually exclusive categories of advertising, game content, and objectionable content, the metadata bits 212 could instead be used so as to categorize content represented in a pixel as belonging to more than one category. For example, one may utilize six metadata bits 212, to obtain a field in the form of "VVXXAA", where the bottom two bits "AA" are allocated to advertising, thereby allowing four values (00, 01, 10, 11) to distinguish among four advertisers, the middle two bits XX are allocated to objectionable/adult content (designating no objectionable conduct by the value 00, and providing for 3 levels of objectionable conduct 01, 10, 11), and the top two bits "VV" are allocated to violence (including no violent conduct 00, and 3 levels of violent conduct 01, 10, 11). These bits are "OR"ed together in a boolean operation into a mask to obtain VVXXAA: ----AA|--XX--|VV----=VVXXAA. The mask is used by the system to determine which pixels are acceptable to display and which pixels are unacceptable to display. Thus, a pixel from a children's game might be indicated by metadata having a value of "000000", a pixel from a banner ad for an adult web site might be indicated by metadata having a value of "001101" (violence level 0, adult content level 3, Advertisement #1), a second advertisement on the same page with a video game character wearing a revealing costume and holding a gun might be indicated by metadata having a value of "010110" (violence level 1, adult content level 1, Advertisement #2), and the famous photograph of a Vietnamese prisoner being executed point blank by a soldier on a historical web site might be indicated by metadata having a value of "110000" (violence level 3, adult content level 0, no advertising).

The OR'ed mask from the metadata is AND'ed with the OR'ed mask of the users preferences. For example, if the user's preference mask is 111100 (no violent or adult content, advertising untouched), and the metadata for one pixel is 001111 (an ad for, say, a pornographic web site), the result of 111100 && 001111=001100. If the result is non-zero, as it is in this case, then the pixel is blocked. In another example, if the users preference mask is 101100 (no strong violent content, no adult content) and a pixel has data 010000 (say, an ad for a detective story, with a weakly violent image of a hand with a gun), the result is 101100 && 010000=000000, and the pixel can be displayed. In practice, it can get more complicated in situations where binary numbers do not work. Therefore, in certain situations, a "greater than/less than" comparison would be needed instead of a pure boolean operation like an "OR" operation.

Metadata bits 212 can be allocated in many other different ways and for other purposes. For example, eight or sixteen metadata bits 212 can be used to further categorize the content of pixels 125, such as identifying additional advertisements, offering additional levels by which to categorize content as adult-oriented, violent, etc., or utilizing 8 bits for filtering and 8 bits for statistical data. The bits may also be allocated to utilize fewer total metadata bits 212 to accomplish the tasks of metering and filtering of content. Some of these approaches utilize fewer bits by allocating values for a larger selection space, other than on a per pixel basis. Thus, for example, a set of four or more adjacent pixels 125 might all be designated as having violent content so a single value for all four or more pixels 125 could record this fact, rather than allocating one or more bits per pixel for this purpose.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

What is claimed is:

1. An apparatus comprising a processor for execution of stored instructions, the execution of which causes the apparatus to:
   facilitate display of image data comprising a plurality of pixels; and
   process said image data, wherein, for each of the plural pixels, said image data comprises at least first and second portions of image data that are linked together, the first portion including payload data and the second portion including metadata, said payload data comprises content for the pixel and said metadata comprises a value selected from a predefined set of values which classifies the pixel independently from the other pixels;
   facilitate classification of each of the processable pixels individually according to a particular metadata value selected from the predefined set of values;
   perform operations on individual pixels based on their metadata; and
   facilitate filtering of the content by obscuring the content of only a plurality of pixels that has a metadata value that exceeds a discretionary threshold value without preventing display of the content of the remaining plurality of pixels that does not have a metadata value that exceeds the discretionary threshold value.

2. The apparatus of claim 1, wherein the processor for execution of stored instructions is further configured to cause the apparatus to:
   determine a display metric, said display metric being the result of multiplying the number of pixels having a certain metadata value by an amount of time those pixels are visible on a display.

3. The apparatus of claim 1, wherein obscuring the content of only a plurality of pixels comprises at least one of blurring, scrambling or displaying the pixels as black, showing only silhouette.

4. A method comprising:
   facilitating display of a plurality of pixels;
   receiving image data, wherein, for each of the plural pixels, said received image data comprises at least first and second portions of image data that are linked together, the first portion including payload data and the second portion including metadata,
   wherein said payload data comprises content for the pixel and said metadata comprises a metadata value selected from a predefined set of values which classifies the pixel independently from the other pixels;
   causing said received image data to be supplied to a display;
   processing the content for each respective pixel based on the metadata value of each respective pixel;
   obscuring the content of only a plurality of pixels that has a metadata value exceeding a discretionary threshold value, and
   facilitating display of the content of the remaining plurality of pixels that do not have a metadata value exceeding the discretionary threshold value.

5. The method of claim 4, wherein the display is embodied in a wireless terminal.

6. The method of claim 4, further comprising:
   determining a display metric, said display metric being the result of multiplying the number of pixels having a certain metadata value by an amount of time those pixels are visible on the display.

7. The method of claim 4, wherein obscuring the content of only a plurality of pixels comprises at least one of blurring, scrambling or facilitating display of the pixels as black, showing only silhouette.

8. The method of claim 4, further comprising controlling, via a processor, at least one of a graphics board, a browser of markup language documents, or an e-mail program.

9. The method of claim 4, wherein the metadata value indicates that a single pixel is part of a visual object within a particular category and the category comprises at least one of violent content, pornographic content, or advertisements.

10. The method of claim 4, further comprising, facilitating filtering for one of blocking and/or obscuring a visual object by obscuring a plurality of pixels forming said visual object, wherein each of the plural pixels forming said visual object has a metadata value which indicates that its pixel is part of a visual object which must be blocked and/or obscured.

11. An apparatus comprising a processor for execution of stored instructions, the execution of which causes the apparatus to:
   receive an image data frame comprising a plurality of pixels which, comprise one or more visual objects, wherein a plurality of contiguous bits in the image data frame comprises pixel data for a single pixel, the pixel data comprises a content field and a metadata field for the single pixel, wherein the metadata field comprises a value from a predefined set of metadata values, and wherein the metadata value indicates that the single pixel is part of a visual object within a particular category; and
   identify pixels which comprise a visual object by their metadata fields,
   wherein, because the pixels comprising an individual visual object are identifiable within the image data frame, certain operations are performed only on the pixels forming an individual visual object separate from the pixels forming the remaining visual objects in the visual field.

12. The apparatus of claim 11, wherein the processor for execution of stored instructions is further configured to cause the apparatus to control a graphics board, a browser of markup language documents, and/or an e-mail program.

13. The apparatus of claim 11, wherein the particular category comprises at least one of violent content, pornographic content, or advertisements.

14. The apparatus of claim 11, wherein the processor for execution of stored instructions is further configured to cause the apparatus to:
   facilitate filtering configured to block and/or obscure a visual object by obscuring each of a plurality of pixels forming said visual object, wherein each of the plural pixels forming said visual object has a metadata value which indicates that its pixel is part of a visual object which must be blocked and/or obscured.

15. The apparatus of claim 11, wherein the processor for execution of stored instructions is further configured to cause the apparatus to:
   determine a display metric, said display metric being the result of multiplying the number of pixels having a certain metadata value by an amount of time those pixels are visible on a display.

16. The apparatus of claim 11, wherein the certain operations performed only on the pixels forming an individual visual object comprises at least one of blurring, scrambling or facilitating display of the pixels as black, showing only silhouette.

17. A computer-readable storage medium being encoded with a computer program, the computer program comprising:
   program code for facilitating display of a plurality of pixels;
   program code for receiving image data;
   program code for causing said received image data to be supplied to a display;
   program code for processing the content for each respective pixel based on the metadata value of each respective pixel;
   program code for obscuring the content of only a plurality of pixels that has a metadata value exceeding a discretionary threshold value, and
   program code for facilitating display of the content of the remaining plurality of pixels that do not have a metadata value exceeding the discretionary threshold value;
   wherein, for each of the plural pixels, said received image data comprises at least first and second portions of image data that are linked together, the first portion including payload data and the second portion including metadata; and
   wherein said payload data comprises content for the pixel and said metadata comprises a metadata value selected from a predefined set of values which classifies the pixel independently from the other pixels.

18. The computer program product of claim 17, wherein the display is embodied in a wireless terminal.

19. The computer program product of claim 17, further comprising:
   program code for determining a display metric, said display metric being the result of multiplying the number of pixels having a certain metadata value by an amount of time those pixels are visible on the display.

20. The computer program product of claim 17, wherein obscuring the content of only a plurality of pixels comprises at least one of blurring, scrambling and facilitating display of the pixels as black, showing only silhouette.

* * * * *